Nov. 17, 1959     L. C. CLARK, JR     2,913,386
ELECTROCHEMICAL DEVICE FOR CHEMICAL ANALYSIS
Filed March 21, 1956
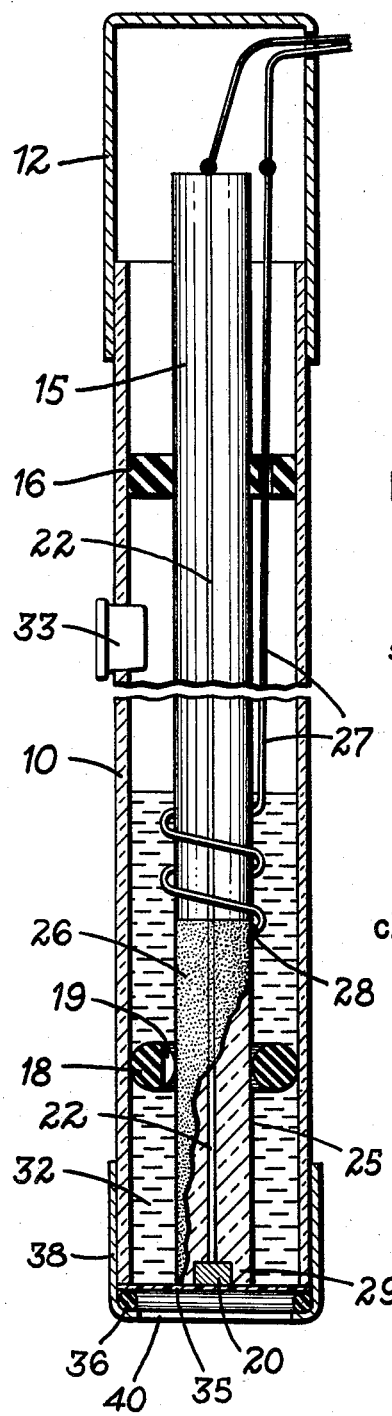
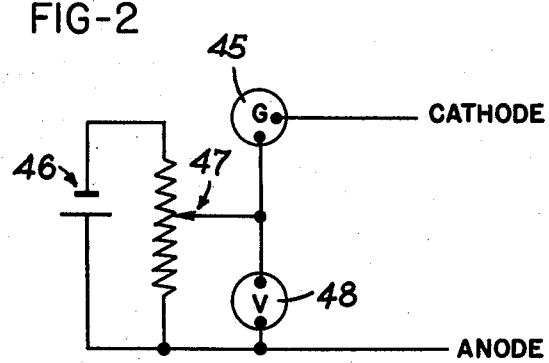
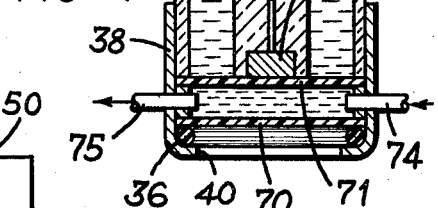
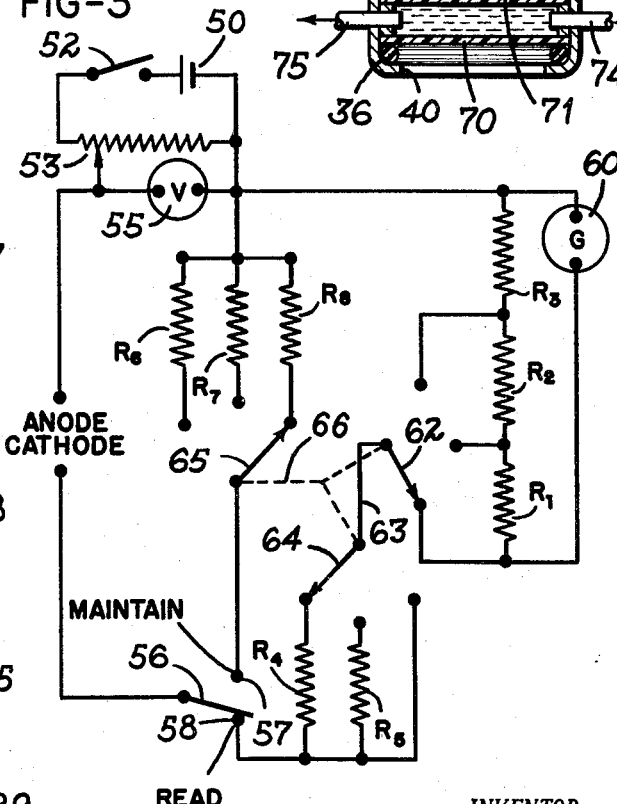
INVENTOR.
LELAND C. CLARK, JR.
BY
Marechal, Biebel, French & Bugg
ATTORNEYS

United States Patent Office 2,913,386
Patented Nov. 17, 1959

2,913,386
ELECTROCHEMICAL DEVICE FOR CHEMICAL ANALYSIS

Leland C. Clark, Jr., Yellow Springs, Ohio

Application March 21, 1956, Serial No. 573,029

14 Claims. (Cl. 204—195)

This invention relates to an electrolytic device for use in chemical analysis, and particularly to a polarographic cell adaptable for use in making quantitative analyses, especially continuous analyses.

The present invention provides a means whereby direct measurements of the proportional quantity of a substance in a composition of matter are made by noting the effect of that substance upon the electrical characteristics of a polarographic cell and comparing that effect with known or determinable standards. In its simplest form the polarographic cell comprises an anode and a cathode in electrical circuit with each other through a suitable electrolyte or electrolyte forming substance. The electrolyte is provided by a compound, solution, or other suitable material which will form with the anode and cathode an electric cell, and which will provide ions for reactions with the substance which it is desired to measure in such a way as to affect the electrical characteristics of the cell.

The application of polarography to many fields of science has been heretofore limited by the difficulties encountered in undesired reactions between the cell components which destroy the usefulness or accuracy of the cell, for example, by altering the properties of the electrolyte so that the reaction between the ions and a certain substance in a composition under analysis is interfered with or not accurately observable. Also, in some cases the cathode may become plated with certain substances in the composition, thereby rendering the cell inoperable. As an example of such limitations in use of certain polarographic cells, the measurement of free oxygen in certain gases has been accomplished by bubbling the gas through a liquid electrolyte in which an anode and cathode are immersed. Such a method however is not feasible with certain gases and with oils which are non-miscible with the electrolyte used. Furthermore, it is necessary to standardize the cell under such circumstances and it is quite likely that in the process of standardizing the properties of the electrolyte may be changed. Also, when the composition being continually analyzed is used as the electrolyte the properties of the electrolyte may change of their own accord, as in industrial fermentation processes for example. Substances which might plate the cathode and render the cell useless could be removed prior to analysis, yet, prior removal of the undesired substance from the composition to be analyzed could change the entire quantitative (or even qualitative) make-up of the composition and thus the subsequent determinations would be erroneous as to the original composition.

In accordance with this invention the anode and cathode pair are electrically connected through a "captive" electrolyte or electrolyte forming substance which is protected from turbulence and preferably is physically isolated and electrically insulated from the composition to be analyzed by a barrier means permeable to the substance which it is desired to measure in the composition, and which barrier means is impermeable to all other constituents of the composition which might have an effect on the electrical characteristics of the cell.

Accordingly, the primary object of this invention is to provide an electrode pair supported in predetermined spaced relationship and electrically connected by an electrolyte or a substance reactable to form an electrolyte, and to provide a selectively permeable barrier for separating the electrode pair and the electrolyte or other substance from the composition to be analyzed.

A further object of this invention is to provide a cell for use in polarography embodying a pair of electrodes supported in predetermined spaced relationship and having a chamber around the electrodes containing an electrolyte in sufficient quantity to provide an electrical connection between them, and to provide a selectively permeable barrier means in a wall of the chamber for admitting only desired substances into the chamber for reaction with the electrolyte.

Another object of the invention is to provide such a cell including means for adding a buffer solution to the electrolyte in accordance with the need of such buffer to maintain the concentration of certain ions in the electrolyte as desired.

It is an additional object of this invention to provide analytical apparatus including a polarographic cell having an anode and a cathode immersed in an electrolyte and also having a membrane selectively permeable to the substance to be measured for isolating the cell members from the composition to be analyzed, and including suitable electrical controls and instruments for observing the quantity of electrical current passing through the cell.

Other objects and advantages of the invention will be apparent from the following description, the accompanying drawing and the appended claims.

In the drawing—

Fig. 1 is a detail view, partly in section and partly in elevation, of a cell according to the present invention;

Fig. 2 is a schematic diagram of a simple circuit in which the cell of Fig. 1 may be used;

Fig. 3 is a diagram of a circuit including the cell of Fig. 1 and a type of galvanometer for use in observing the changes in conductivity of the cell over a wide range of values; and Fig. 4 is a detail view of a modified cell.

Referring to the drawing, which illustrates a preferred embodiment of the present invention, and particularly to Fig. 1, a typical cell in accordance with the present invention is illustrated as including a tubular body 10 defining a chamber closed at its upper end by a cap 12 and having an insulating rod 15 supported coaxially therewithin by means of an upper washer-like spacer 16, and a lower ring type of spacer 18 slotted at 19 to provide passage for liquid to the lower end of the cell. Within the lower end of rod 15 there is a button-type cathode 20 of a suitable conductive material connected to a cathode lead-in wire 22 which extends within rod 15 to the upper end thereof. The lower outer surface 25 of rod 15 is coated with a suitable conductive material 26 to provide an anode, and an anode lead wire 27 extends through the upper spacer 16 and is wrapped around the lower or coated surface 25 of rod 15 and suitably fixed thereto at a connection 28.

The spacing between the anode and cathode, provided by the thickness of the annular portion 29 of the lower end of rod 15, is thus maintained in predetermined fixed relation, and the space directly below this annular end portion 29 acts as a "bridge" through which ions are transferred and electrical current travels while the reactions occur in the space directly below cathode 20. An electrolyte material 32, preferably including a suitable buffer, is supplied to the well surrounding the lower end of rod 15 and thus to the aforementioned "bridge" and reaction spaces. This well maintains an adequate supply of electrolyte and assures an adequate supply of ions at the appropriate electrode, as necessary for operation of the polarographic cell. If additional solution is required after an extended period of operation, such solution may be added as desired through an opening in the side wall of tube 10, normally closed by a stopper 33.

The electrolyte, the electrodes, and the "bridge" and reaction spaces are all isolated and electrically insulated from the outside of the tube by a selectively permeable barrier means provided by a membrane 35 extending across the end of tube 10 and held in place by an O-ring seal 36 received within the lower cap 38, which in turn is provided with a relatively large central opening 40 to admit the composition to be analyzed to the outer surface of membrane 35. The required spacing between membrane 35 and cathode 20 and the surrounding rod lower end 29 can be provided by roughening the annular lower face of the rod end 29 to provide for access of the electrolyte to the cathode.

The material of which membrane 35 is formed varies in accordance with the properties of the gas, solution, or other composition which it is desired to analyze. For example, when the cell is to be used for determining the oxygen content of a gas or a solution, membrane 35 may be of polyethylene which will pass the oxygen to the interior of the cell, while forming a barrier to other substances which would affect the electrical characteristics of the cell.

In the operation of the cell the electrolyte 32 provides for the flow of electrons in the electro-reduction and electro-oxidation processes used in polarography. In the determination of oxygen content, for example, these processes take place in accordance with the overall equation $$2H^+ + O + 2e \rightarrow H_2O$$

wherein $H^+$ represents a hydrogen ion, O represents an oxygen atom, and $e$ represents an electron. Of course, for continual determination a suitable supply of ions must be provided, for continual combination or reaction with the substance being measured. In determinations of oxygen, as an example, regulation of the hydrogen ion concentration to maintain an adequate supply of such ions at the cathode may be accomplished by adding a suitable buffer to the electrolyte.

The sensitivity of the cell may also be affected to some degree by liberation of ions from the noble metal cathode at low potentials and with electrolytes of certain pH values. This sensitivity can be overcome to a great extent by selecting cathodes having desirably high values of overvoltage for the ions in question. For example, it has been found that in a cell for use in determinations of oxygen a gold cathode extends the usefulness of the cell over a wider range of pH values, since the gold has a high value of hydrogen overvoltage.

The electrical characteristics of the cell will be affected in proportion to the quantity of the substance to be measured passing through membrane 35. For instance, when measuring oxygen the electrical current carrying capacity of the cell will vary in direct proportion to the quantity of oxygen passing into the electrolyte, since a sufficient supply of hydrogen ions will be maintained by the buffer in the electrolyte tending to polarize the cell, and the cell will be depolarized in proportion to oxygen reacting with the hydrogen ions.

When such a cell is connected to a circuit as in Fig. 2, so that an applied voltage of about 0.6 volt is maintained across the cell, a current will flow in the presence of the substance being measured since that substance will tend to depolarize the cell. For example, current readings on the galvanometer 45 will be proportional to oxygen passing through the protective membrane. Such a cell, having a 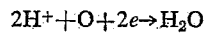 silver-silver chloride anode and a platinum cathode in an electrolyte of an aqueous sodium chloride solution, and suitably calibrated in gases having known oxygen tensions, will give a current flow which is proportional to the quantity of oxygen contained in the composition being examined.

A simple circuit such as in Fig. 2 includes a battery 46 having a potentiometer 47 connected to the terminals thereof, and a voltmeter 48 connected between the variable arm of the potentiometer and the positive terminal of the battery. The potentiometer and voltmeter provide for an accurate adjustment of the potential difference desired across the cell, usually in the vicinity of 0.6 v. The cathode is connected to the potentiometer contact on the negative side of battery 46 and the anode is connected to the positive terminal, with the galvanometer 45 in the line to the cathode. Variations in the current through the cell, as observed on galvanometer 45, will be in proportion to the quantity of the substance being measured passing through the selectively permeable barrier membrane 35 and reacting with ions in the cell to alter its electrical characteristics.

Fig. 3 illustrates another circuit in which the cell of Fig. 1 may be used, for observing relatively small electrical currents passing through the galvanometer. In this circuit a battery 50 is connected through switch 52 with a potentiometer 53. A voltmeter 55 is connected between the variable arm of potentiometer 53 and the negative terminal of battery 50, for the purpose of observing the potential difference between the arm of the potentiometer and the negative battery terminal, and thus to provide adjustment of the desired voltage to be impressed across the cell. The anode is connected to the potentiometer arm, and the cathode is connected to the central terminal of a single pole double throw switch 56 movable between an upper "maintain" position at contact 57, and a lower "read" position at contact 58.

The galvanometer 60 is provided with a plurality of shunting resistors R1, R2 and R3 in series with each other and connected in parallel across the terminals of the galvanometer. The selecting switch 62 has three positions wherein it connects a lead 63 to one or more of the resistors R1, R2 or R3, and the lead 63 is in turn connected to another switch 64 which is movable between positions connecting resistances R4 and R5 into the galvanometer circuit, or to a straight-through connection with the "read" contact 58. Switches 64 and 62 are operated simultaneously to select different series and paralleled combinations of resistances in circuit with the galvanometer. For example, in the position shown R4 is in series with the entire group of R1, R2 and R3, which are in shunt with the galvanometer.

The "maintain" contact 57 is connected to a third switch 65 connected at 66 to operate with switches 62 and 64, and movable between three positions wherein the cell is placed in series with one of resistances R6, R7, or R8. The value of these resistances is selected so as to correspond to the total resistance of the galvanometer and its various shunt and series circuits in the three positions of switches 62 and 64 and hence to balance the current and to maintain the same resistance regardless of whether the switch 56 is in the "read" or the "maintain" position. In practice, the various resistances have been selected to give a range of galvanometer readings sensitive to variations of one microampere, two microamperes and four microamperes with a battery of one-half volt and with a potential difference across the cell of about 0.6 v.

It is also possible under certain circumstances to select electrode pairs having a battery action, thereby providing a polarographic cell according to the invention which is self-energized. With such a cell the circuit shown in Fig. 2 may be further simplified, to the extent that the battery and potentiometer for impressing a predetermined potential difference across the cell are eliminated and the cell lead wires connected directly to a galvanometer or other suitable device for observing and/or recording the changes in current carrying capacity of such a self-energized cell. A cell of this type is especially suited for use in situations where it is desired to have a continuous analysis of a composition, but where a minimum of equipment requiring minimum attention is also desirable.

It may also be desirable in some instances to utilize a non-electrolytic type of captive "electrolyte" substance in the cell which will not conduct unless combined with or subjected to certain substances, radicals, ions, and the like under study. Accordingly, the term "electrolyte forming substance" as used herein is intended to embrace those substances which are in themselves electrolytes and also other substances which are capable of reacting with other substances or radicals or ions under study to form an electrolyte. For example, in studying the concentration of certain ions in a solution, a normally non-conductive solution or paste may be provided between the electrodes of the cell of such character that it will be reactable with such ions to form a conducting solution or paste. Such a cell would then be standardized with known quantities of ions under study, and used to test such ions with the permeable barrier means selected to be permeable to such ions and impermeable to others which might react with the electrolyte formng substance to form an electrically conductive product.

It will be appreciated that different types of apparatus may be used to observe the electrical activity of the cell. For example, a recording galvanometer has been used in a circuit similar to the one shown in Fig. 3 to provide a continuous record of the changes in current flowing through the polarographic cell, and thus to give a continuous record of the quantity of the substance being measured. Successful results have been obtained with a cell utilizing a platinum cathode and a silver-silver chloride anode, and using an aqueous sodium chloride solution as an electrolyte. This cell is utilized for the determination of oxygen, and accordingly membrane 35 is formed from polyethylene. Suitable results have also been obtained in oxygen determinations using as an electrolyte an aqueous solution of sodium chloride with added glycerine. Other materials which have been found suitable for membrane 35 in oxygen determinations are silastic, rubber, and vinyl chloride.

It is also possible to provide a barrier means permeable only to the desired substances by passing a thin film of selectively permeable fluid between two thin fixed permeable plates or membranes. Such a modified construction is shown in Fig. 4, wherein suitable membrane plates 70 and 71 are supported in spaced relation, and a quantity of selectively permeable fluid, such as silicone oil, is passed between these plates from an inlet 74 to an outlet 75. Such a modified barrier means functions in the same manner and for the same purpose as the membrane 35 shown in Fig. 1.

The polarographic cell provided by this invention is adaptable to many uses and to a variety of scientific and industrial fields. For example, the cell can be used to determine oxygen in a liquid, a gas, or a solid. A cell can be devised for use in determining such electro-reducible or electro-oxidizable gases as $SO_2$, or to determine inert gases such as CO. In the latter instance, it may be desirable to have the inert gas react with special cell electrolytes whose electrical activity is affected in an irreversible way by the inert gas, and in such a case a large reservoir of the electrolyte solution can be maintained for diffusion slowing in front of the electrode surfaces. In determining solids, or salts in solution, the permeable barrier means is selected so as to be permeable to certain ions. For example, certain membranes made from ion exchange resins may be used, having surfaces or molecular charges such that they are permeable to certain classes of ions.

Polarographic cells sensitive to oxygen may be constructed in accordance with this invention in small sizes such that the diameter of cap 38 is about one-half inch and the length of the cell is in the order of four to five inches. Such a small cell can be calibrated in known atmospheres and subsequently utilized as an altimeter, or used in a face mask for an aircraft pilot to provide a hypoxia warning device. Other exemplary uses of the oxygen measuring cells are in determining the basal metabolism of a patient by measuring the oxygen consumption by difference between inspired and expired air and the volume of air exchanged, and in many industrial applications wherein it is desired to know the oxygen content of water, saline, sewage, oil, or other compositions.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A polarographic cell for use in analyzing a composition to determine the quantity of a certain substance in said composition, said cell comprising: an anode and a cathode; means supporting said anode and said cathode in fixed spaced relationship; means for confining an electrolyte forming substance in electrical current carrying contact with said anode and said cathode; means for impressing a predetermined electrical potential across said anode and said cathode; barrier means surrounding said anode and said cathode and said electrolyte forming substance to physically separate and electrically insulate said electrolyte from said composition being analyzed, said barrier means being permeable to the substance in said composition the quantity of which it is desired to determine, said substance being reactable with said electrolyte forming substance to alter the electrical characteristics of said cell, said barrier means being impermeable to all other constituents of said composition reactable with said electrolyte forming substance; and means for observing variations in the electrical characteristics of the cell caused by reactions between said electrolyte forming substance and said substance to which said barrier means is permeable.

2. In a device for use in determining the proportional quantity of a substance in a composition of matter, the combination of: a pair of electrodes; insulating means supporting said electrodes in predetermined spaced relationship; means defining a chamber around said electrodes; an electrolyte contained in said chamber in sufficient quantity to fill the space between said electrodes; a membrane selectively permeable to the substance to be measured, said membrane forming one of the walls of said chamber and being adapted to be exposed to the composition of matter, said membrane separating said electrolyte from said composition and permitting passage of said substance therethrough into said electrolyte within said chamber; means for impressing a predetermined electrical potential across said electrodes; and means for measuring the current in the circuit comprising said electrodes and electrolyte.

3. In an electrode assembly for exposure to a constituent to be measured by polarographic analysis, the combination of: a first electrode providing a first surface thereon; a membrane selectively permeable to said constituent; means supporting said membrane with one face thereof closely adjacent to said first surface to define a liquid film space therebetween, the other face of said membrane being exposable to an environment containing said constituent to be measured; a reservoir for an electrolyte; liquid passage means between said reservoir and said film space for maintaining a film of electrolyte in said space; and a second electrode positioned on the same side of said membrane as said first electrode for contact with said electrolyte for forming an electrical circuit between said first electrode, said electrolyte, and said second electrode.

4. In an electrode assembly for exposure to a constituent to be measured by polarographic analysis, the combination of: a first electrode providing a first surface thereon; a membrane selectively permeable to said constituent; means supporting said membrane with one face thereof closely adjacent to said first surface to define a liquid film space therebetween, the other face of said membrane being exposable to an environment containing said constituent to be measured; a reservoir for an electrolyte forming substance, the volume of the reservoir being large relative to the volume of said film space; a restricted passage between said reservoir and said film space for maintaining a film of electrolyte forming substance in said space; and a second electrode positioned on the same side of said membrane as said first electrode for contact with said electrolyte forming substance for forming an electrical circuit between said first electrode, said electrolyte forming substance and said second electrode.

5. In an electrode assembly for exposure to a constituent to be measured, the combination of: an electrically insulating support body; a first electrode embedded in said support body and having an exposed surface at a face of said body and substantially flush therewith; membrane means selectively permeable to said constituent; means for supporting said membrane with one face thereof closely adjacent to said electrode surface and said body face defining a liquid film space between said membrane and said electrode surface and defining an ionic passage between said membrane and said body face, the other face of said membrane being exposable to an environment containing said constituent; reservoir means for enclosing a body of electrolyte forming substance of relatively large volume compared with the volume of said film space, said reservoir means adjoining and communicating with said passage to maintain a film of said electrolyte forming substance in said film space; and a second electrode positioned on the same side of said membrane as said first electrode for contact with said electrolyte forming substance for forming an electrical circuit between said first electrode, said electrolyte forming substance and said second electrode.

6. In a probe assembly for polarographic measurement of oxygen in a gaseous or liquid medium, the combination of: an anode; a cathode; a chamber enclosing said anode and said cathode and adapted to contain an electrolyte for bridging said anode and said cathode, said chamber including an oxygen permeable barrier forming a wall thereof; means for maintaining said barrier closely adjacent to said cathode to form an electrolyte film space therebetween, said chamber isolating said medium from access to said film space and said cathode except by way of said barrier; circuit means for applying a potential to said cathode and said anode; and means coupled to said circuit means for indicating a current in said circuit means as a function of oxygen permeating said membrane into said film space.

7. In a measuring cell for determining the presence of a particular substance in a composition of matter, the combination of: a chamber having an opening therein for communication with the composition of matter; an anode electrode and a cathode electrode; means for mounting said electrodes in said chamber in spaced relationship; selectively permeable and electrolyte forming means for blocking said opening and isolating said electrodes from the composition and forming an electric current path between said electrodes; and means coupled to said electrodes for impressing a predetermined electrical potential across said electrodes and observing variations in the electrical current characteristics of the cell as a function of the quantity of the particular substance permeating into said chamber.

8. In a measuring cell, the combination of: an anode electrode and a cathode electrode; means for supporting said electrodes in said cell in predetermined spaced relationship; a medium electrolytically bridging said electrodes to form an electrical circuit therewith; a chamber having two permeable walls permitting passage of selected substances into said chamber through one of said walls and out of said chamber through the other of said walls, the outer face of said one wall being positioned to be exposed to a composition being analyzed; means for mounting said chamber in said cell with both of said electrodes on the same side of said chamber and with the outer face of said other wall in contact with said medium; and means for passing a selectively permeable fluid through said chamber between said walls.

9. In a measuring instrument for exposure to a constituent to be measured, the combination of: a first electrode having a polarographic sensitive electrode surface; means for defining an electrolyte space adjoining said sensitive surface, said means including a membrane permeable to the constituent to be measured, the outer surface of said membrane being exposable to an environment containing the constituent; a second electrode polarographically complementary to said first electrode, both said electrodes being positioned on the side of said membrane opposite the side exposed to said environment; and electrolyte means providing an ionic solution in said electrolyte space in contact with said sensitive surface and the inner surface of said membrane, and forming an ionic bridge between said first and second electrodes, the volume of said electrolyte space being small to provide a short equilibration time for said electrolyte means and a short time constant in the measurement.

10. In an instrument for measuring a constituent in either a gaseous or liquid environment, the combination of: a polarographic sensing electrode; means defining an electrolyte space immediately adjacent to said sensing electrode, said means including a membrane permeable to said constituent, said membrane separating said electrolyte space from said environment; a body of electrolyte with at least a portion of said electrolyte filling said electrolyte space; and a reference electrode electrically isolated from said sensing electrode except through said electrolyte and positioned on the same side of said membrane as said sensing electrode for contact with said body of electrolyte, said sensing electrode effecting a signal current through said electrolyte and said reference electrode by removal of said constituent from said electrolyte space, said space being of small volume and providing a short diffusion path between said membrane and said sensing electrode for rapid equilibration of said current to changes of said constituent in said environment.

11. In a measuring instrument for use in determining the proportional quantity of a nonionic dissolved gaseous component in a composition to be analyzed, the combination of: an anode electrode and a cathode electrode; means for supporting said electrodes in predetermined relationship; chamber means defining a chamber enclosing said electrodes, said chamber means including permeable membrane means for separating said electrodes from the composition to be analyzed, said membrane means being permeable to said gaseous component and impermeable to interfering ionic and nonvolatile components in the composition; an ionic solution enclosed in said chamber for forming an ionic path between said electrodes; and means for impressing a predetermined electrical potential across said electrodes to cause an ionic current flow in said path in response to transmission of said gaseous component from the composition through said membrane means into said chamber.

12. In a measuring instrument for exposure to a constituent to be measured, the combination of: a first electrode having a sensitive electrode surface; a second electrode electrically isolated from said first electrode; a membrane selectively permeable to said constituent; means for supporting said membrane for separating said electrodes from said constituent with one face of said membrane closely adjacent to said electrode surface to define a liquid film space therebetween, the other face of said membrane being exposable to an environment containing said constituent to be measured; and a body of electrolyte with at least a portion thereof positioned in said liquid film space in contact with said sensitive electrode surface and said membrane; for forming a current path from said second electrode through said electrolyte to said first electrode.

13. In a polarographic measuring cell, the combination of: an anode electrode and a cathode electrode; means for supporting said electrodes in said cell in predetermined spaced relationship; a medium electrolytically bridging said electrodes to form an electrical circuit therewith; and selectively permeable barrier means carried by said cell for separating said electrodes and medium from a composition being analyzed, said barrier means permitting particular substances present in said composition to pass therethrough and into said medium for producing changes in electrical characteristics of said circuit.

14. In a polarographic cell, the combination of: an anode electrode and a cathode electrode; means for supporting said electrodes in said cell in predetermined spaced relationship; and selectively permeable barrier means carried by said cell and positioned with respect to said electrodes to define a space adapted for filling with a medium to form an electrical circuit between said electrodes, said barrier means separating both said electrodes from a composition being analyzed whereby during cell operation particular substances present in said composition will pass therethrough and into the medium for producing changes in electrical characteristics of said circuit.

References Cited in the file of this patent
UNITED STATES PATENTS

| | | |
|---|---|---|
| 2,278,248 | Darrah | Mar. 31, 1942 |
| 2,415,067 | Wallace | Jan. 28, 1947 |
| 2,624,701 | Austin | Jan. 6, 1953 |
| 2,651,612 | Haller | Sept. 8, 1953 |
| 2,732,335 | Glass | Jan. 24, 1956 |
| 2,745,803 | Leveque | May 15, 1956 |
| 2,745,804 | Shaffer | May 15, 1956 |
| 2,760,922 | Williams | Aug. 28, 1956 |
| 2,787,903 | Beard | Apr. 9, 1957 |

OTHER REFERENCES

Busch et al.: Applications of the Dropping Mercury Electrode to BOD Determinations, Tech. Info. Service, Oak Ridge, Tenn., May 27, 1952; p. 3 and 21.

D. W. Brubaker and Karl Kammermeyer: Separation of Gases by Plastic Membranes, Industrial & Engineering Chemistry, vol. 46, No. 4, pp. 733–742.

UNITED STATES PATENT OFFICE
CERTIFICATE OF CORRECTION

Patent No. 2,913,386

November 17, 1959

Leland C. Clark, Jr.

It is hereby certified that error appears in the printed specification of the above numbered patent requiring correction and that the said Letters Patent should read as corrected below.

Column 9, line 6, after "membrane" strike out the semicolon.

Signed and sealed this 3rd day of May 1960.

(SEAL)
Attest:

KARL H. AXLINE
Attesting Officer

ROBERT C. WATSON
Commissioner of Patents